(12) United States Patent
Nakajima

(10) Patent No.: US 8,760,740 B2
(45) Date of Patent: Jun. 24, 2014

(54) IMAGE FORMING APPARATUS, CONTROL METHOD THEREFOR, AND COMPUTER PROGRAM

(75) Inventor: Nobuyuki Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 548 days.

(21) Appl. No.: 12/962,999

(22) Filed: Dec. 8, 2010

(65) Prior Publication Data

US 2011/0261426 A1 Oct. 27, 2011

(30) Foreign Application Priority Data

Apr. 27, 2010 (JP) ................. 2010-102523

(51) Int. Cl.
*G03F 3/08* (2006.01)
(52) U.S. Cl.
USPC ............ 358/518; 358/2.1; 358/3.23; 382/167
(58) Field of Classification Search
USPC ........... 358/518, 519, 531, 534, 537, 1.9, 2.1, 358/3.01, 3.23, 1.13; 382/162, 167
See application file for complete search history.

(56) References Cited

U.S. PATENT DOCUMENTS

| 7,755,795 B2 * | 7/2010 | Shimada ................. 358/1.9 |
| 2004/0105582 A1 * | 6/2004 | Boesten et al. ............ 358/3.21 |
| 2006/0012809 A1 * | 1/2006 | Shimada ................. 358/1.9 |
| 2007/0171440 A1 * | 7/2007 | Yoshida ................. 358/1.9 |
| 2008/0068628 A1 * | 3/2008 | Dokuni ................. 358/1.9 |
| 2010/0245873 A1 * | 9/2010 | Shimada ................. 358/1.9 |

FOREIGN PATENT DOCUMENTS

| JP | 10-124276 A | 5/1998 |
| JP | 2010120290 A * | 6/2010 |

* cited by examiner

*Primary Examiner* — Kimberly A Williams
(74) *Attorney, Agent, or Firm* — Carter, DeLuca, Farrell & Schmidt, LLP

(57) ABSTRACT

When color data and monochrome data are mixed in a piece of bit map data rasterized from the job data, an image forming apparatus allows a user to set whether to perform pre-color conversion processing on the monochrome data to enable performing color conversion processing on the monochrome data using a color conversion table for color, or whether to disable printing the job data including the bit map data in which color data and monochrome data are mixed.

13 Claims, 11 Drawing Sheets

FIG. 5

| JOB ID | STATUS |
|---|---|
| 01 | ERROR (NOT YET OUTPUT) |
| 02 | OUTPUT COMPLETED |
| 03 | RIP IN PROGRESS |

IMAGE FORMING APPARATUS, CONTROL METHOD THEREFOR, AND COMPUTER PROGRAM

BACKGROUND OF THE INVENTION

1. Field of the Invention

The present invention relates to an image forming apparatus, a control method for the image forming apparatus, and a computer program.

2. Description of the Related Art

In a printing apparatus, job data, including page-description language (PDL) data, is sent from an external apparatus, such as a personal computer (PC), to a rendering unit, where the job data is rasterized into bit map data, and after the bit map data is subjected to color conversion processing in a printer engine, the bit map data is printed onto a medium, such as a sheet of paper. In some printing apparatuses, however, pre-color conversion processing is performed on the bit map data by the rendering unit before it is sent to color conversion processing by the printer engine. The pre-color conversion processing includes pre-color processing, which is performed on color data, and monochrome processing, which is performed on monochrome data. These preliminary types of processing are performed to produce subtle differences in reproduction of, for example, warm-tone black, cold-tone black, and pure black in monochrome processing in the color conversion processing in the printer engine. Warm-tone black is gray added with a shade of red which is reproduced to give a warm impression about black in monochrome processing. Cold-tone black is gray added with a slight blue tone which is reproduced to give a cold impression. Pure black is used as a neutral black.

In the color conversion processing in the printer engine, a color conversion table for color print is used for color data, and a color conversion table for monochrome print is used for monochrome data. In the pre-color conversion processing, pre-color processing is performed on data which is subjected to color-conversion processing for color print in the printer engine unit, and pre-monochrome processing is performed on data which is subjected to color conversion processing for monochrome print.

In an ordinary printing apparatus, if color data and monochrome data are included in rendered bit map data, color data and monochrome data are separated, and color conversion for color is performed on color data, and color conversion for monochrome is performed on monochrome data (Japanese Patent Application Laid-Open No. 10-124276). In such a configuration, color conversion processing needs to be performed by switching between a color conversion table for color and a color conversion table for monochrome.

However, when high-speed printing is performed with the printer engine, color conversion processing by the printer engine needs to be executed at high speed according to the printing speed. When color data and monochrome data are mixed in rendered bit map data, if it is necessary to switch between a color conversion table for color and a color conversion table for monochrome, the color conversion processing sometimes takes too long to be in time for printing.

For example, in two-sided printing or saddle stitch binding, it is necessary to perform imposition in advance while considering layout of pages. As a result of the imposition, monochrome page data and color page data are often included in rendered bit map data. In this case, high-speed printing is unfeasible due to a use of different color conversion tables for color and monochrome. For this reason, in a printing apparatus for high-speed print, when monochrome pages and color pages are mixed in rendered bi-map data, this may be treated as an error and the processing may be suspended.

SUMMARY OF THE INVENTION

The present invention is directed to an image forming apparatus capable of continuing print processing even when monochrome pages and color pages are mixed in rendered bit map data.

According to an aspect of the present invention, an image forming apparatus includes a rasterization unit configured to rasterize job data into bit map data, a color conversion unit configured to perform color conversion processing on the bit map data by using a color conversion table for color when the bit map data rasterized by the rasterization unit is subjected to color conversion in a color mode, and to perform color conversion processing on the bit map data by using a color conversion table for monochrome when the bit map data rasterized by the rasterization unit is subjected to color conversion in a monochrome mode, a pre-color conversion unit configured to perform color conversion processing on the job data before the bit map data is subjected to the color conversion processing by the color conversion unit when the job data is rasterized into the bit map data by the rasterization unit, and a performing unit configured to, when color data and monochrome data are mixed in a piece of bit map data to be rasterized by the rasterization unit, perform color conversion using the color conversion table on the color and monochrome mixed bit map data by the pre-color conversion unit.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a diagram illustrating a job status window in a list view on the UI according to the exemplary embodiment of the present invention.

DESCRIPTION OF THE EMBODIMENTS

The "printing apparatus" described herein is not limited to a special-purpose machine specialized in printing, but includes a multifunction peripheral that performs a variety of functions including a printing function and a manufacturing machine that forms images and patterns on recording paper.

Figure 1:
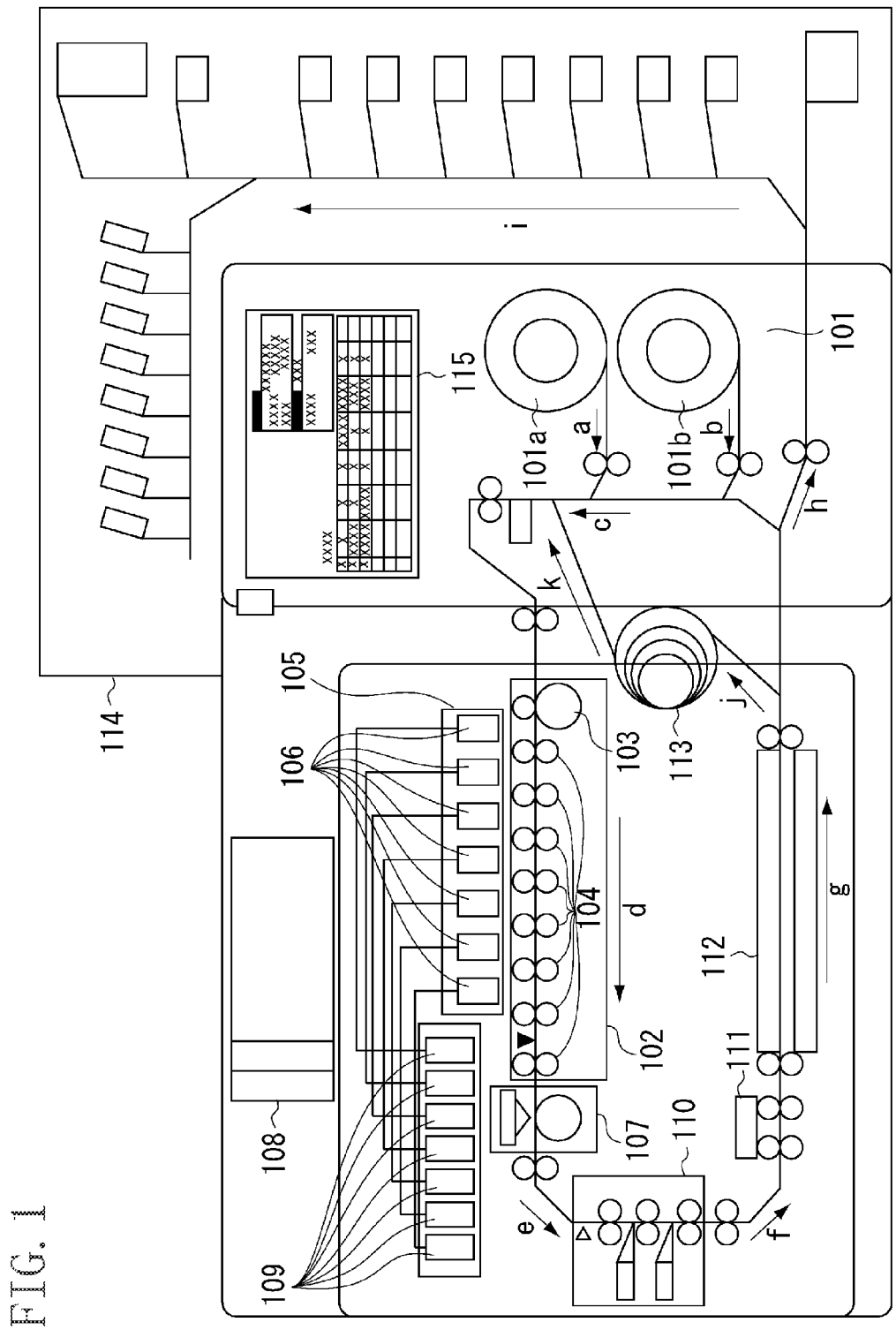
FIG. 1 is a sectional view illustrating a general structure of a printing apparatus according to an exemplary embodiment of the present invention.

FIG. 1 is a sectional view of a general structure of an image forming apparatus (printing apparatus) according to an exemplary embodiment of the present invention, which uses a continuous sheet, which is longer than a unit of print in the conveyance direction.

A roll sheet unit 101 includes an upper sheet cassette 101a and a lower sheet cassette 101b. A user loads a roll sheet (hereafter referred to as sheet) in a magazine and mounts the magazine on the image forming apparatus. A sheet drawn out from the upper sheet cassette 101a is conveyed in the direction "a", and a sheet pulled out of the lower sheet cassette 101b in the direction "b" in FIG. 1. Each sheet from both cassettes advances in the direction "c" in FIG. 1, and reaches a conveyance unit 102. The conveyance unit 102 conveys the sheets in the direction "d" (horizontal) in FIG. 1 during printing via a plurality of rotating rollers 104.

Above the conveyance unit 102, there is a head unit 105 arranged face to face with the conveyance unit 102. In the head unit 105, independent print heads 106 corresponding to a plurality of colors (seven in this embodiment) are held along the conveyance direction. In synchronism with the conveyance of sheets by the conveyance unit 102, the print heads 106 discharge ink to the sheet to form an image. A print unit is formed by the conveyance unit 102, the head unit 105, and the print heads 106. Independent ink tanks 109 store color inks. The inks are supplied through tubes from the ink tanks 109 to sub tanks provided for the respective colors, and from the sub tanks to the print heads 106. Each print head 106 has line heads for the ink colors arranged along the direction "d" of sheet conveyance during printing. The line head for each color may be formed by a single seamless nozzle chip or by arranging divided nozzle chips in a line or in a regular array, such as a zigzag form. In the present exemplary embodiment, a full-multi-head configuration is adopted such that nozzles are arranged in a range to cover a print width on a maximum sheet used. For an inkjet method that discharges ink from nozzles, it is possible to adopt a method using a heater element, a piezoelectric element method, an electrostatic element method, or an MEMS element method. The timing for discharging ink from respective nozzles based on print data is determined by an output signal from a conveyance encoder 103. The present exemplary embodiment is not limited to a printer of the inkjet type, but various printing methods can be applied, such as a thermal printer (a dye-sublimation type and a thermal transfer type, for example), a dot impact printer, an LED printer, and a laser printer.

After an image is formed on a sheet, the sheet is conveyed from the conveyance unit 102 up to a scanner unit 107. The scanner unit 107 reads a printed image or a specific pattern, and checks the printed image for any problem or also checks the apparatus for its condition. In the present exemplary embodiment, to check images, a method which reads a pattern to check the state of the head or a method which makes comparison with an original image may be selected.

A sheet sent from the scanner unit 107 is conveyed in the direction "e" in FIG. 1 and introduced into a cutter unit 110. The cutter unit 110 cuts the sheet to a predetermined unit print length. The predetermined unit print length varies with an image size to print. For example, an L-size photo is 135 mm long in the conveyance direction, and an A4-size photo is 298 mm long in the conveyance direction.

The sheet sent from the cutter unit 110 is conveyed in the direction "f" in FIG. 1, and comes to a back-side printing unit 111. The back-side printing unit 111 prints information for each printed image (order management No., for example).

After coming out of the back-side printing unit 111, the sheet enters a drying unit 112, which applies a hot air to the sheet passing through the drying unit 112 in the direction "g" in FIG. 1 to dry the ink on the sheet in a short time. The sheets cut to lengths equal to a unit print length pass through the drying unit 112 one sheet after another, and conveyed in the direction "h" in FIG. 1 to enter a sorting unit 114. In the sorting unit 114, the sheets passing in the direction "i" in FIG. 1 are checked by a sensor and stacked separately into preset numbered trays. In the sorting unit 114, the sheets are sorted according to the unit print length and sent into a plurality of trays (22 steps in the present exemplary embodiment). The sorting unit 114 is provided with a display unit with LEDs to display states indicating "stacking in progress" or "completion of stacking, for example".

In two-sided printing, an image is formed on a front side, and, without being cut by the cutter unit 110, the sheet coming in the direction "j" in FIG. 1 is wound up by a sheet take-up unit 113. After all front-side images are formed, the wound sheet is rewound and sent in the direction "k" in FIG. 1 to have an image printed on the back side of the sheet.

An operation unit 115 is used by the operator to check a printing status of each order booked, namely, in which tray a specified order image is contained, or if the image is in the process of printing, or if printing has been completed. Moreover, the operation unit 115 is operated by the operator to check statuses of the apparatus, such as remaining quantities of ink and sheet, and to inspect necessity of maintenance service of the apparatus, such as head cleaning.

Figure 2:
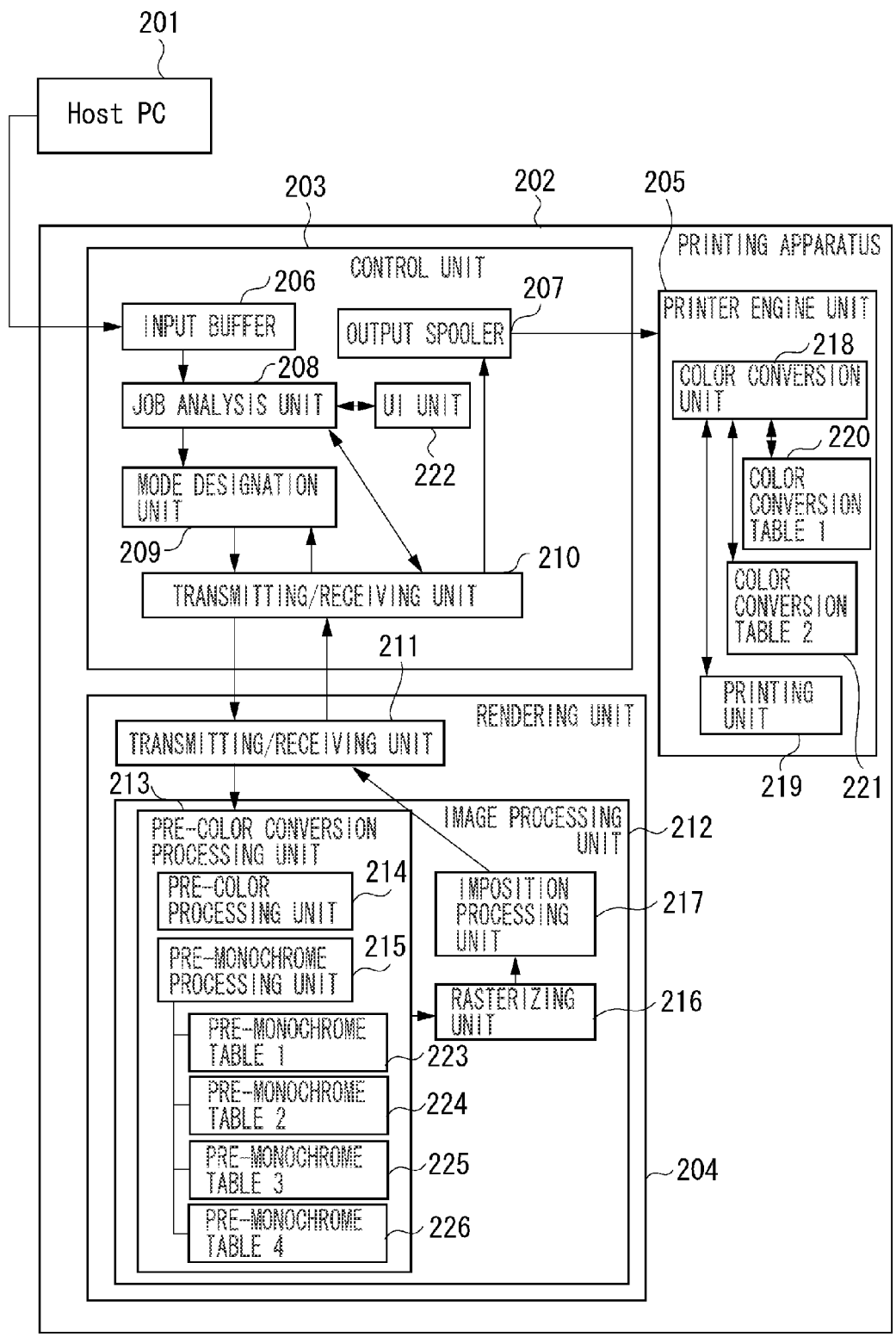
FIG. 2 is a block diagram illustrating a structure of control in the printing apparatus according to the exemplary embodiment of the present invention.

FIG. 2 is a block diagram illustrating a structure of control in the printing apparatus according to the exemplary embodiment of the present invention. In the printing apparatus 202 to print images, job data, including data in page-description language (PDL) received from an external apparatus 201, such as a personal computer, is processed and printed on a roll sheet. The control unit 203 in the printing apparatus 202 analyzes job data from the external apparatus 201, generates a command and data based on the analysis results, and transmits the command and data to the rendering unit 204. The control unit 203 receives rendered data from the rendering unit 204 and transmits the data to a printer engine unit 205, which will be described below. The rendering unit 204 performs rendering processing based on the command and data from the control unit 203, and transmits rendered bit map data to the control unit 203. The rendering unit 204 also performs some pre-color conversion processing during rendering. The pre-color conversion processing is preliminary conversion processing to reproduce desired colors in color conversion processing by the printer engine unit 205. The printer engine unit 205 performs color conversion on bit map data sent from the control unit 203, and prints the bit map data on a medium, such as a roll sheet. The printing apparatus 202 performs high-speed printing while conveying a roll sheet at a constant speed. To this end, a certain amount of rendered bit map data is spooled in the control unit 203, and the data is sent sequentially to the printer engine unit 205 and printed. Therefore, the rendering processing, including pre-color conversion, in the rendering unit 204 has only to be executed before printing, but the color conversion processing in the printer engine unit 205 must be performed at high speed. If there is a delay in the color conversion processing in the printer engine unit 205, print processing has to be interrupted. If the print processing is interrupted once, this causes a stoppage of conveyance of a roll sheet, so that time is taken for sheet positioning and conveyance speed adjustment before the processing is resumed, thus interfering with high-speed printing. For this reason, the aim of the present exemplary embodiment is to enable the printer engine unit 205 to carry out the color conversion processing at high speed.

The job data from the external apparatus 201 is stored in an input buffer 206 in the control unit 203. Then, a job analysis unit 208 analyzes the job to determine whether the job is a color job or a monochrome job and what the layout of the job is like. Based on a result of analysis by the job analysis unit 208, a mode designation unit 209 generates a command to designate a mode of image processing to the rendering unit 204. The job analysis unit 208 also controls a user interface (UI) to display a job status, which will be described below. The modes discussed here refer to color spaces, such as a color mode and a monochrome mode, sides of sheet to print, such as one-sided or two-sided printing, and types of post-processing, such as side stitching or saddle stitch binding. A transmitting/receiving unit 210 in the control unit 203 supplies the rendering unit 204 with a command and data to perform processing in the rendering unit 204.

A monochrome print mode and a color print mode will next be described. Between color and monochrome in photography using silver-halide paper, there are obvious differences at the basic stage where printing paper and color development characteristics are considered, so that they are classified as types of photography with completely different in color tone and gradation characteristics. Also in the present printing apparatus, based on the above-mentioned concept, a color mode and a monochrome mode are provided. The color mode is a print operation mode in which printing is performed using three-dimension look up tables (3D LUT) aimed at color printing. The monochrome mode is a print operation mode in which printing is performed using color parameter tables to express colors and gradation characteristics different from a gray color printed in a color print mode.

The rendering unit 204 receives a command and data sent by the control unit 203, from the transmitting/receiving unit 211, and performs processing by an image processing unit 212. More specifically, a pre-color conversion processing unit 213 performs preliminary color conversion prior to the color conversion processing by the color conversion unit 218 in the printer engine unit 205. This preliminary color conversion is pre-stage processing performed to enable the color conversion unit 218 to express subtle differences in black, such as warm-tone black, cold-tone black, and pure black. For example, a slightly modified black, warm-tone black, is reproduced in monochrome processing, which is a gray color added with a little red tone to give a warm impression in black. Cold-tone black is provided, which is a gray color added with a little blue shade, with an intention of giving a cold impression. Pure black color is a neutral tone of black. A pre-monochrome processing unit 215 includes pre-monochrome tables 1 to 4 (223 to 226), which are used for pre-monochrome processing. A pre-monochrome table 1 is used to perform pre-monochrome processing to generate a warm-tone black. A pre-monochrome table 2 is used to perform pre-monochrome processing to generate a cold-tone black. A pre-monochrome table 3 is used to perform pre-monochrome processing to generate a pure black. A pre-monochrome table 4 is used to perform pre-monochrome processing in a simplified mode, which will be described below. The pre-monochrome processing unit 215 performs conversion using the pre-monochrome tables 1 to 4 (223 to 226) suitable for respective monochrome modes. For example, if monochrome processing is set to warm-tone black, when a pre-monochrome processing is performed by pre-color conversion 1101 in FIG. 11, conversion is performed by using the pre-monochrome table 1 (223). Each monochrome table is a three-dimensional table by input of RGB, and when RGB1 are input, after the conversion is performed, RGB2 is output. In this case, the color conversion unit 218 in the printer engine unit 205 is supposed to be designed to reproduce a gray color with a warm tone, which corresponds to RGB2 as a result of conversion using a pre-monochrome table. Degrees of the warm-tone black, the cold-tone black, and the pure black can be set by the user, and pre-monochrome processing is performed by using a combination of the pre-monochrome tables 1 to 3 (223 to 225) according to setting contents by the user.

In pre-monochrome processing in the simple mode, regardless of whether there has been a setting made for a warm-tone black, a cold-tone black, or a pure black in monochrome processing, processing to reproduce monochrome in color mode in a pseudo manner is performed. When pre-monochrome processing is performed in the simple mode, conversion processing is executed using the pre-monochrome table 4. After this, in color conversion by the printer engine unit 205, conversion processing is performed using a color conversion table for color mode.

Figure 11:
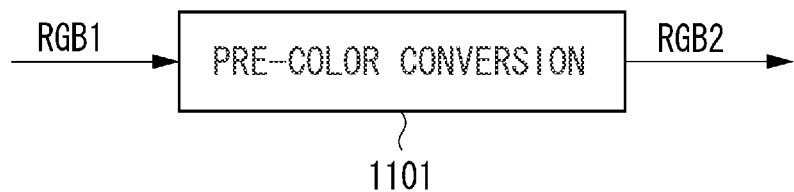
FIG. 11 is a flowchart illustrating pre-color conversion processing according to the exemplary embodiment of the present invention.

In pre-color conversion in color mode, in pre-color conversion 1101 in FIG. 11, for example, different color matching intents are applied separately to image objects, text objects, and graphics objects. As for color matching intents, perceptual, saturation, and colorimetric types are available.

The rasterization unit 216 in the image processing unit 212 interprets PDL data, performs logic drawing, and generates bit map data. The imposition processing unit 217 performs imposition processing according to a binding method, such as side stitching or saddle stitch binding, and according to a type of printing, such as one-sided or two-sided as instructed by a command from the control unit 203, for example, by imposing two pages to a sheet (medium) in the case of saddle stitch binding.

Figure 3:
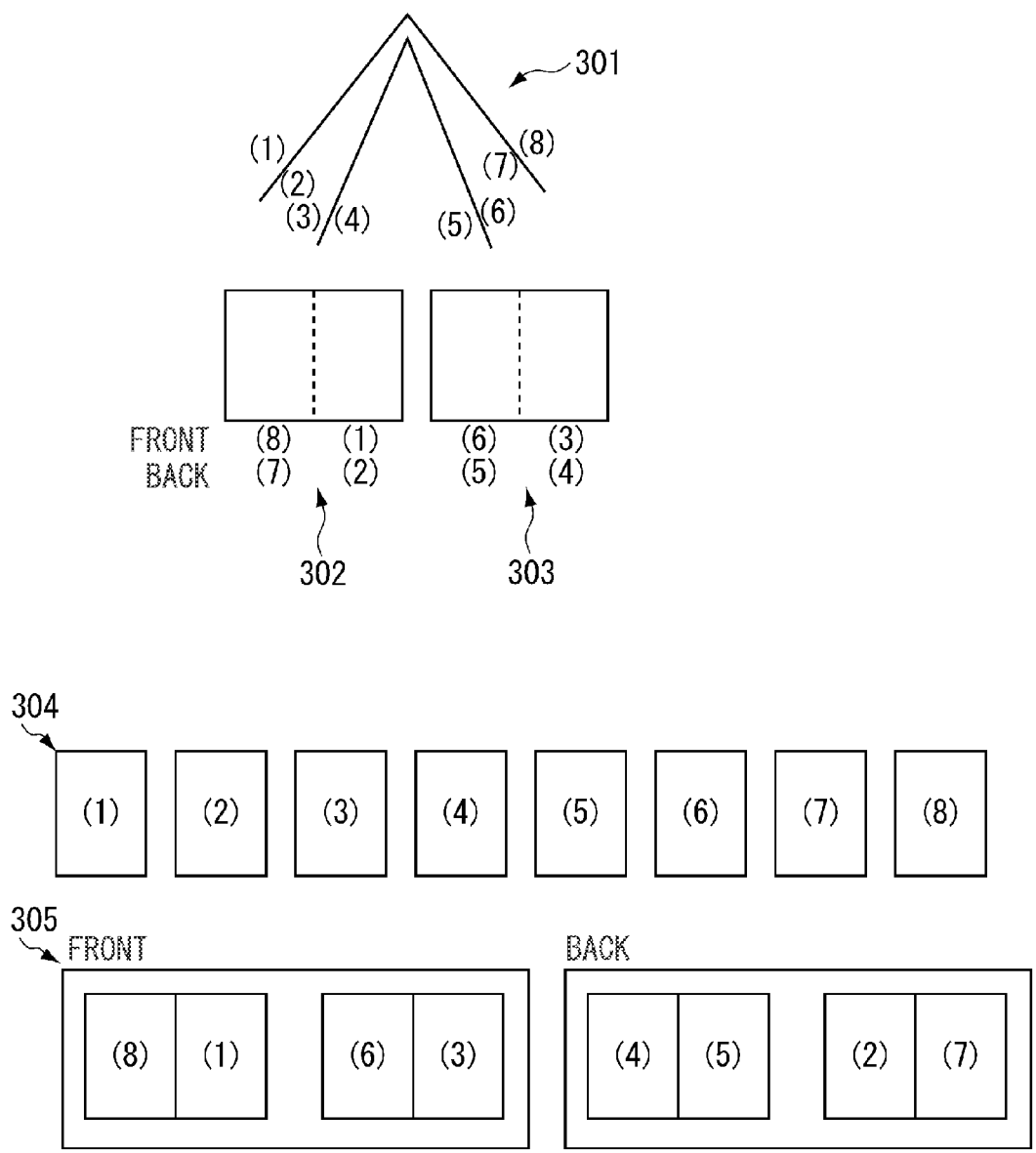
FIG. 3 illustrates imposition processing according to the exemplary embodiment of the present invention.

Imposition processing by the imposition processing unit 217 will be described with reference to FIG. 3. FIG. 3 illustrates an example of imposition of two-sided and saddle stitch binding. A saddle-stitched book 301 is viewed from above, and sequential page numbers are indicated. To obtain a result as illustrated at 301, pages must be printed as indicated by 302 and 303. For example, for pages indicated by 302, page 8 and page 1 are imposed on the front side of sheet 1, and page 7 and page 2 are imposed on the back side of sheet 1. For pages indicated by 303, page 6 and page 3 are imposed on the front side of sheet 2, and page 5 and page 4 are imposed on the back side of sheet 2. To print those imposed pages, pages indicated by 304 are printed in an order indicated by 305. Data 304 corresponds to the pages indicated by 301. The data is imposed as indicated by 305 and printed. In other words, in printing of the front side, a sheet on which page 8 and page 1 are imposed and a sheet on which page 6 and page 3 are imposed are printed continuously. Then, in printing of the back side, a sheet on which page 4 and page 5 are imposed and a sheet on which page 2 and page 7 are imposed are printed continuously. The job analysis unit 208 determines the page layouts, and the imposition processing unit 217 performs imposition according to the layouts determined by the job analysis unit 208.

When two-sided printing and saddle stitch binding are performed, the order of pages is rearranged and imposed on each side of each sheet. The front sides are printed together, and the back sides are printed together. Therefore, it may often happen that color-mode pages and monochrome-mode pages are imposed to the same side of the same sheet, so that color-mode pages and monochrome-mode pages are mixed. For example, let it be assumed that in the book 301, page 2 and page 3 as facing pages are color pages, whereas page 6 and page 7 as facing pages are monochrome pages with text. In this case, in printing, page 2 and page 7 are printed on the same side of the same sheet, and page 3 and page 6 are printed on the same side of the same sheet. Color conversion has only to be executed by changing the color conversion tables page by page or section by section in the bit map data to be printed on the same side of the same sheet. The printing apparatus 202, however, needs to perform color-conversion processing by the printer engine unit 205 at high speed to execute high-speed printing. Therefore, the printing apparatus 202 performs color conversion using the same color conversion table without changing the color conversion tables page by page or section by section of the bit map data. If color pages and monochrome pages are mixed in bit map data to be printed on the same side of the same sheet, monochrome pages are subjected to pre-monochrome processing in the simple mode, and further undergo color conversion by the printer engine unit 205 using a color conversion table for color mode.

The bit map data processed by the imposition processing unit 217 is transmitted from the transmitting/receiving unit 211 to the transmitting/receiving unit 210 in the control unit 203. In the example of FIG. 3, bit map data of imposed pages 8 and 1 and bit map data of imposed pages 6 and 3 are sent sequentially as data for the front side. Then, bit map data of imposed pages 4 and 5 and bit map data of imposed pages 2 and 7 are sent sequentially as data for the back side of the sheet.

The bit map data received at the transmitting/receiving unit 210 is stored in an output spooler 207. At the same time, status information about the bit map data is sent to the job analysis unit 208. The status information indicates whether the job data has been rendered, or whether there is any error that has occurred, for example, and this information is used to display a job status on the UI unit, which will be described below. For example, when an error occurs in the image processing unit 212 in the rendering unit 204, status information about the error is sent through the transmitting/receiving units 211 and 210 to the job analysis unit 208. The job analysis unit 208 performs control to display a status of each job on the UI unit. FIG. 5 illustrates a list view of job status in the UI unit. FIG. 5 illustrates a job status window 501 on the UI unit. The job status window 501 displays a job ID 502, at which processing is in progress, and a current status 503 about the job ID 502. For example, the current status of a job with a job ID of 01 indicates an error (not yet output), and the status of a job with a job ID of 02 indicates that output has been completed. The job status is designed to be updated to reflect latest information.

The control unit 203 sends bit map data in the output spooler 207 and header information about the data to the printer engine unit 205 in an order in which the data is output. The printer engine unit 205 performs color conversion on the received bit map data at the color conversion unit 218 based on contents of header information of the data. The header information holds information about the data whether to perform color conversion in monochrome mode or in color mode. When performing color conversion on color data in color mode, the color conversion unit 218 uses a color conversion table 1 for color (220). When performing color conversion on monochrome data in monochrome mode, the color conversion unit 218 uses a color conversion table 2 for monochrome (221). In the color conversion processing, the color conversion unit 218 converts the color space from RGB to CMYK used in the printing unit 219, for example, and executes binarization processing when necessary. Data, after subjected to color conversion processing, is sent to the printing unit 219 and printed on a medium.

Some flows of processing the control unit 203 will be described by using flowcharts illustrated in FIGS. 6, 7, and 8. The processing by the control unit 203 is divided into processing to deliver data to the rendering unit 204, processing to receive data from the rendering unit 204, and processing to display a job status on the UI unit.

Figure 6:
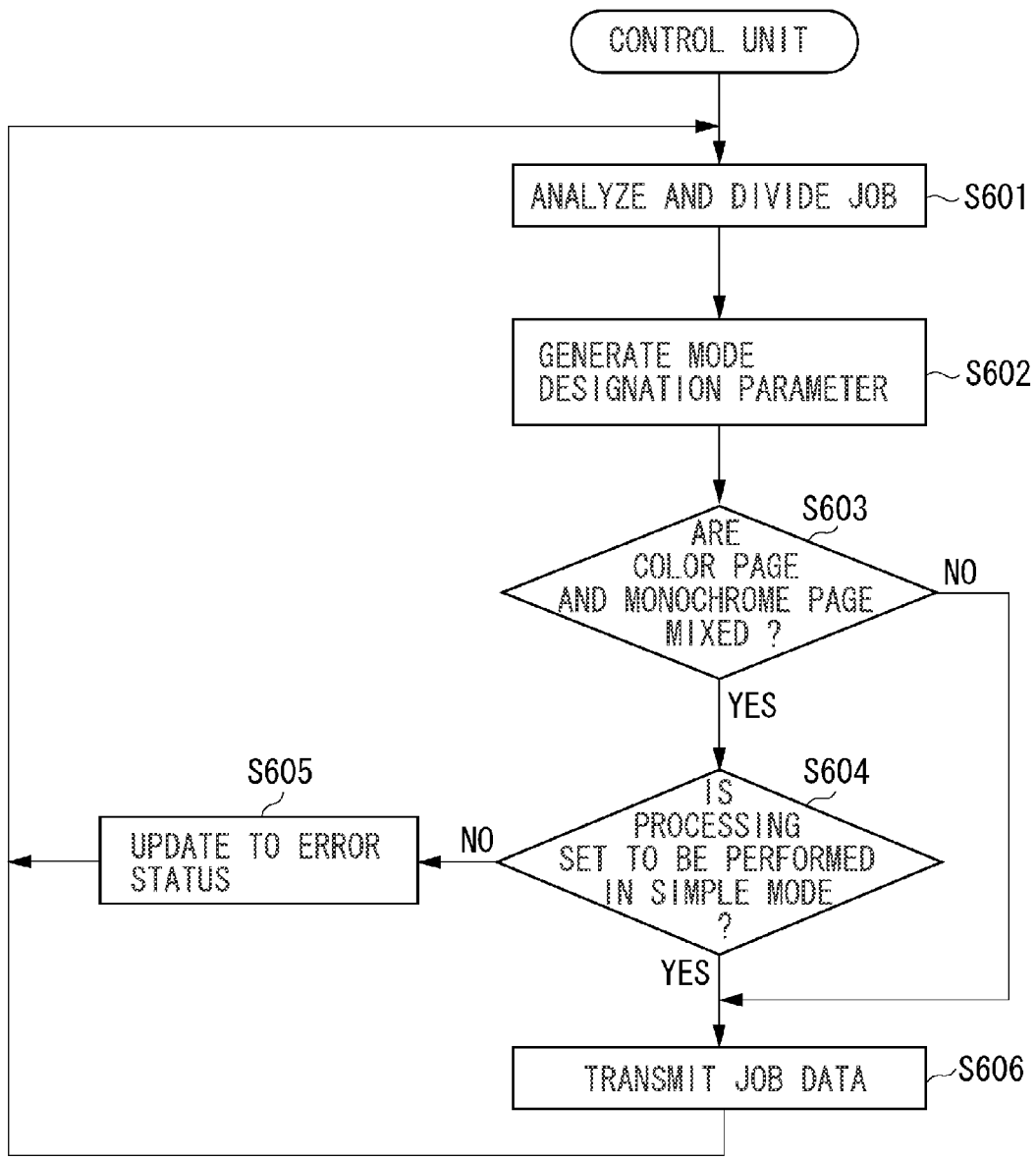
FIG. 6 is a flowchart illustrating first processing by a control unit according to the exemplary embodiment of the present invention.

FIG. 6 illustrates processing to deliver data to the rendering unit 204. The control unit 203 receives job data, such as data in PDL (page-description language) from the external apparatus 201, such as a host PC, and sends the job data to the input buffer 206. When job data is input to the input buffer 206, in step S601, the control unit 203 performs job analysis at the job analysis unit 208, and also divides the job into small units to facilitate processing of the data at the rendering unit 204. In job analysis processing, the job analysis unit 208 analyzes whether the job is a color job or a monochrome job, or what the layout of the job is like. The job analysis unit 208 also rearranges the order of pages included in the job according to the layout analyzed.

In step S602, the control unit 203 controls the mode designation unit 209 to generate a mode designation parameter. Based on a result of analysis by the job analysis unit 208, the control unit 209 generates a command to specify a mode of image processing to the rendering unit 204.

Figure 4:
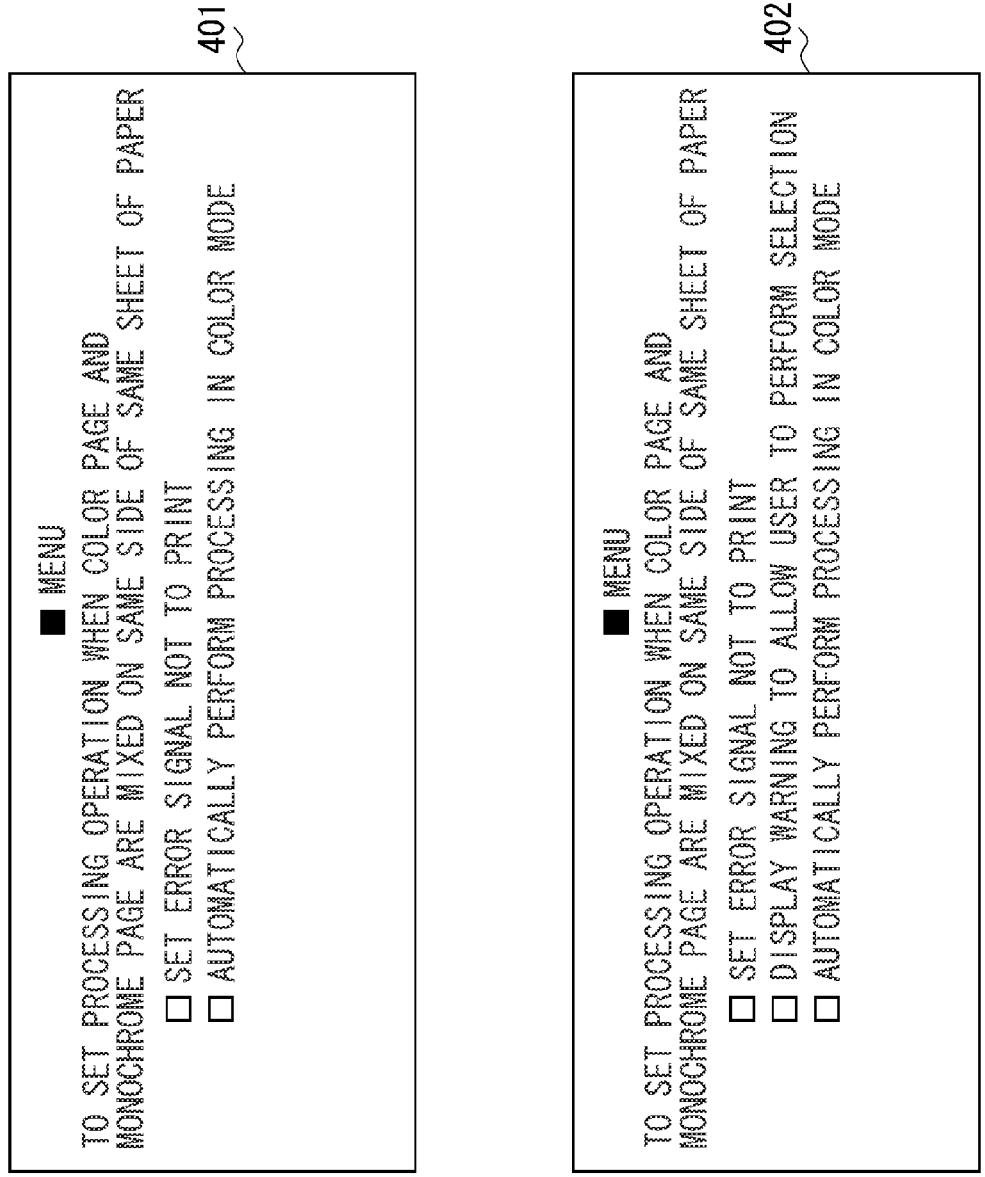
FIG. 4 illustrates examples of a menu in a user interface (UI) according to the exemplary embodiment of the present invention.

In step S603, when the order of pages of the job is rearranged according to the layout, the control unit 203 determines whether the job has color mode pages and monochrome mode pages mixed in the bit map data which is printed on the same side of the same sheet. If color pages and monochrome pages are not mixed in the bit map data to be printed on the same side of the same sheet (NO in step S603), the processing proceeds to step S606. If color pages and monochrome pages are mixed in the bit map data (YES in step S603), then in step S604, the control unit 203 checks the current menu settings, details of which will be described with reference to FIG. 4. FIG. 4 illustrates contents of menus displayed on the UI unit 222. A menu 401 is used to set processing operations of a job when color pages and monochrome pages are mixed in bit map data, which is printed on the same side of the same sheet. This menu allows the user to select types of operation, such as whether to set an error signal to stop printing or whether to let processing take place automatically in color mode. A menu 402 includes an option to select display of warning in addition to the settings of the menu 401. The types of operations may be increased or decreased according to design. Settings for processing of a saddle stitch binding job, in which color pages and monochrome pages are mixed may be made as illustrated in FIG. 5. When the printing apparatus is unable to perform book binding other than saddle stitch binding and two-sided printing when color pages and monochrome pages are mixed in bit map data to be printed on the same side of the same sheet, it has only to be possible to set processing of a saddle stitch binding job in which color pages and monochrome pages are mixed.

In step S604, the control unit 203 checks contents of settings made by the user on the menu 401. If setting has been made for processing to take place automatically (in the simple mode), the processing proceeds to step S606, in which the control unit 203 causes the transmitting/receiving unit 210 to send a job status and a relevant command to the rendering unit 204. At this time, the command generated in step S602 is sent accompanied by information about the job that color pages and monochrome pages are mixed in bit map data which is printed on the same side of the same sheet. After step S606, the processing returns to step S601, in which the next job is analyzed. In step S604, if it has been set at the menu that printing is not performed due to error, then in step S605, the status of the job is updated to an error status, and the processing returns to step S601. On this occasion, the job is not processed.

Figure 7:
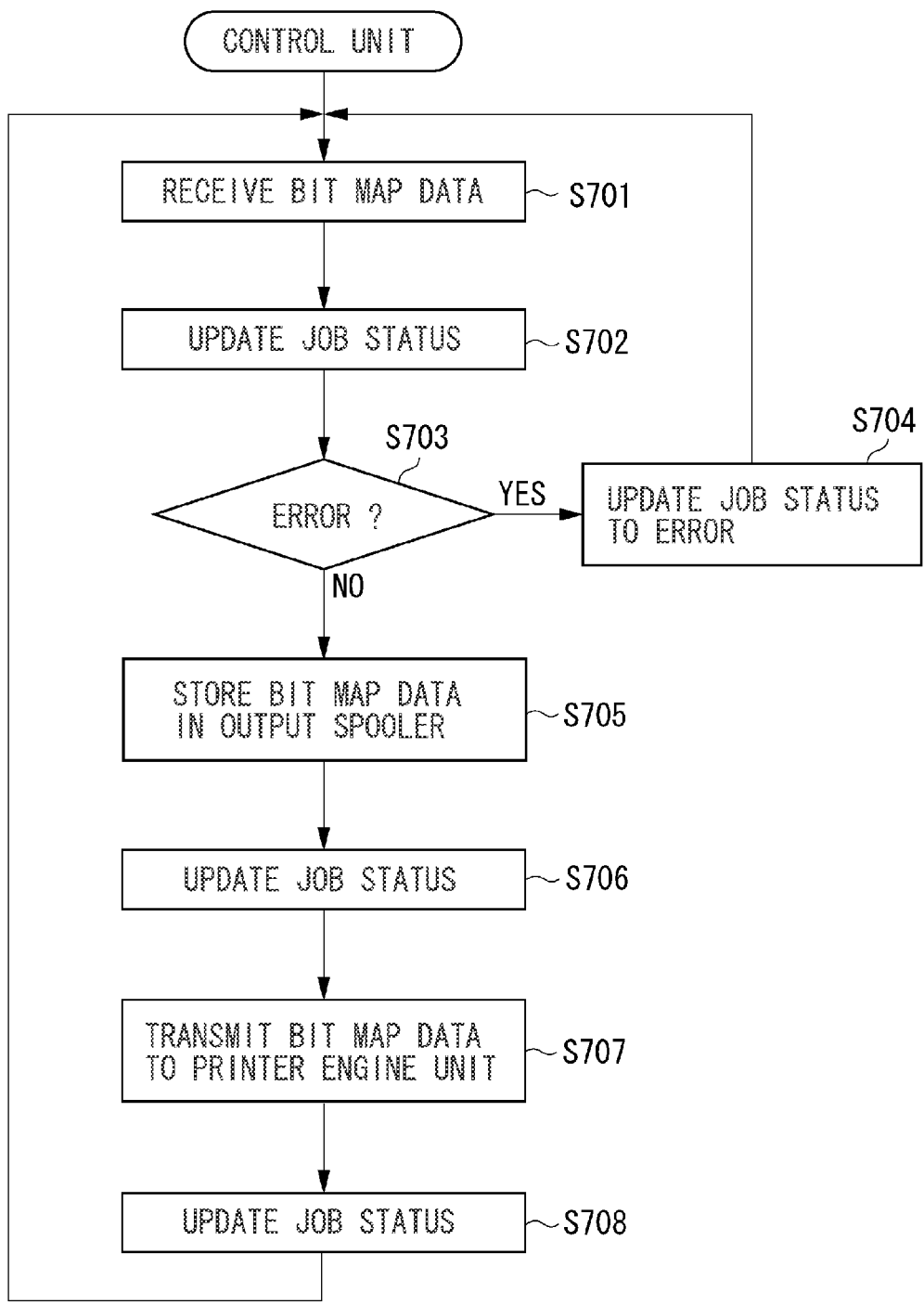
FIG. 7 is a flowchart illustrating second processing by the control unit according to the exemplary embodiment of the present invention.

FIG. 7 illustrates processing by the control unit 203 to receive data from the rendering unit 204. In step S701, the control unit 203 receives, at the transmitting/receiving unit 210, bit map data and status information of the job from the rendering unit 204. In step S702, the control unit 203 updates the status of the job to a status indicating the completion of rendering. In step S703, the control unit 203 determines whether a rendering result is an error based on the job status information received in step S701. If an error has occurred in the job in the rendering unit 204, since the job status indicates error occurrence, then in step S703, an error is detected (YES in step S703), and then in step S704, the status of the job with the job ID is updated to an error status. In step S705, bit map data is stored in the output spooler 207. In step S706, the control unit 203 updates the job status to a status of waiting for output. In step S707, the control unit 203 sends bit map data and header information of the data from the output spooler 207 in the order of printing to the printer engine unit 205. Then, in step S708, the job status is updated to output in progress. Then, the processing returns to step S701, and the control unit 203 receives a next bit map data.

Figure 8:
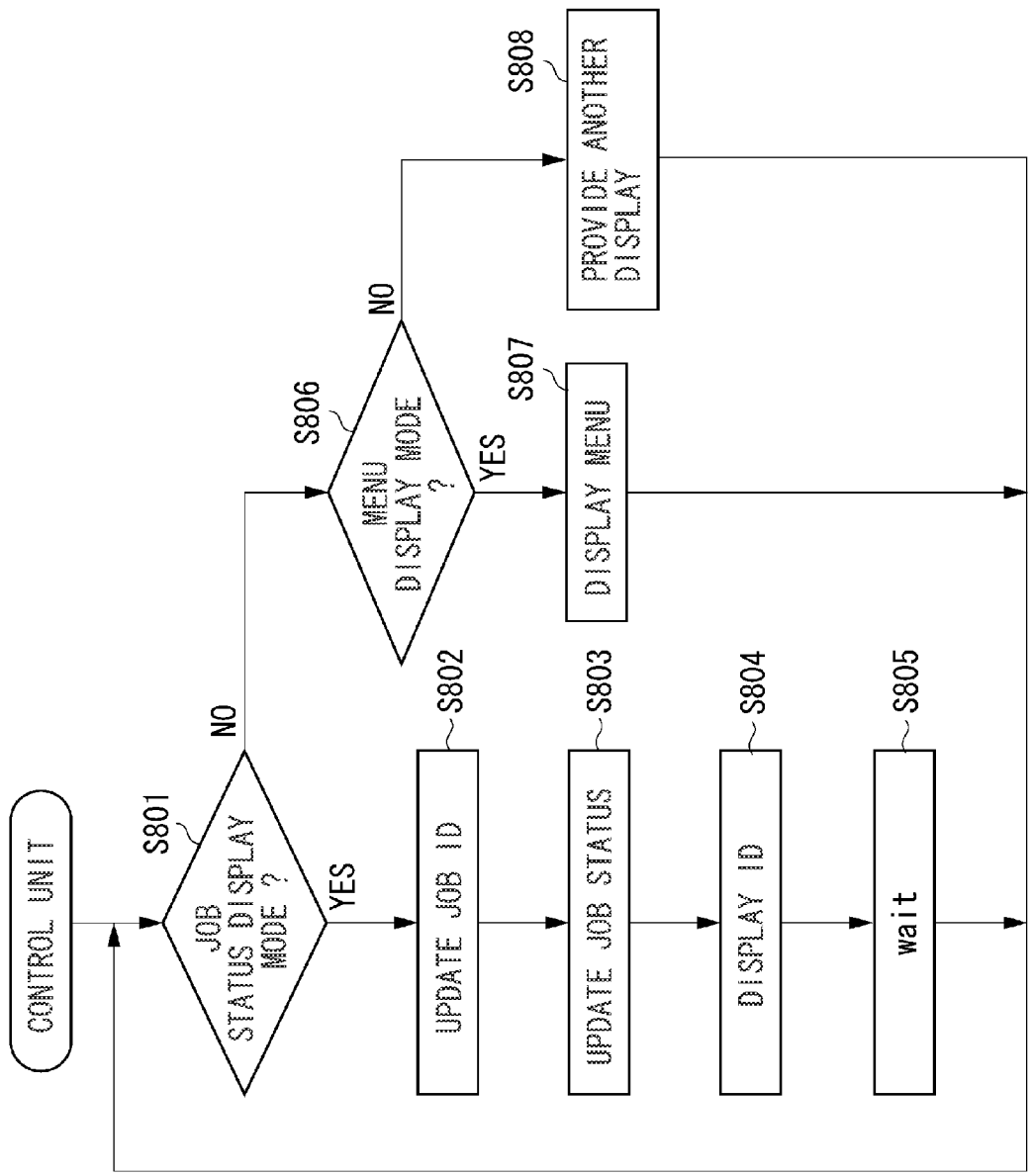
FIG. 8 is a flowchart illustrating third processing by the control unit according to the exemplary embodiment of the present invention.

FIG. 8 illustrates processing for display on the UI unit. In step S801, the control unit 203 determines whether the current mode is a job status display mode. Display on the UI unit can be performed in various ways. For example, in step S801, when the current mode is not the job status display mode (NO in step S801), then in step S806, the control unit 203 determines whether the current mode is a menu mode. If the current mode is the menu mode (YES in step S806), then in step S807, the control unit 203 displays a menu such as has been described referring to FIG. 4. If the current mode is not the menu mode (NO in step S806), then in step S808, the control unit 203 sequentially searches for and displays a relevant mode. Processing when the current mode is the job status display mode in step S801 will be described. In this mode, a job status as illustrated in FIG. 5 is displayed. The control unit 203 performs control to display a status for each job on the UI unit. On the job status window 501 in FIG. 5, the control unit 203 displays a job of a job ID 502 being processed and a current status 503 of the job. For example, the current status of the job with a job ID of 01 indicates a status of not yet output due to an error. The status of a job with a job ID of 02 indicates output completed. The job status display is configured to be sequentially updated to latest information. In step S802, the control unit 203 updates the job ID to be displayed. The control unit 203 displays each newly added job on the job window, and deletes unnecessary jobs because they have been output. All events of the jobs are associated with the job IDs. In step S803, the control unit 203 obtains latest information about the job status associated with the job IDs, and updates the tables for display. In step S804, the control unit 203 displays those tables for display and the job status shown in FIG. 5 on the UI unit. Then, in step S805, after the lapse of a waiting time of several milliseconds, for example, when necessary, the processing returns to step S801.

Figure 9:
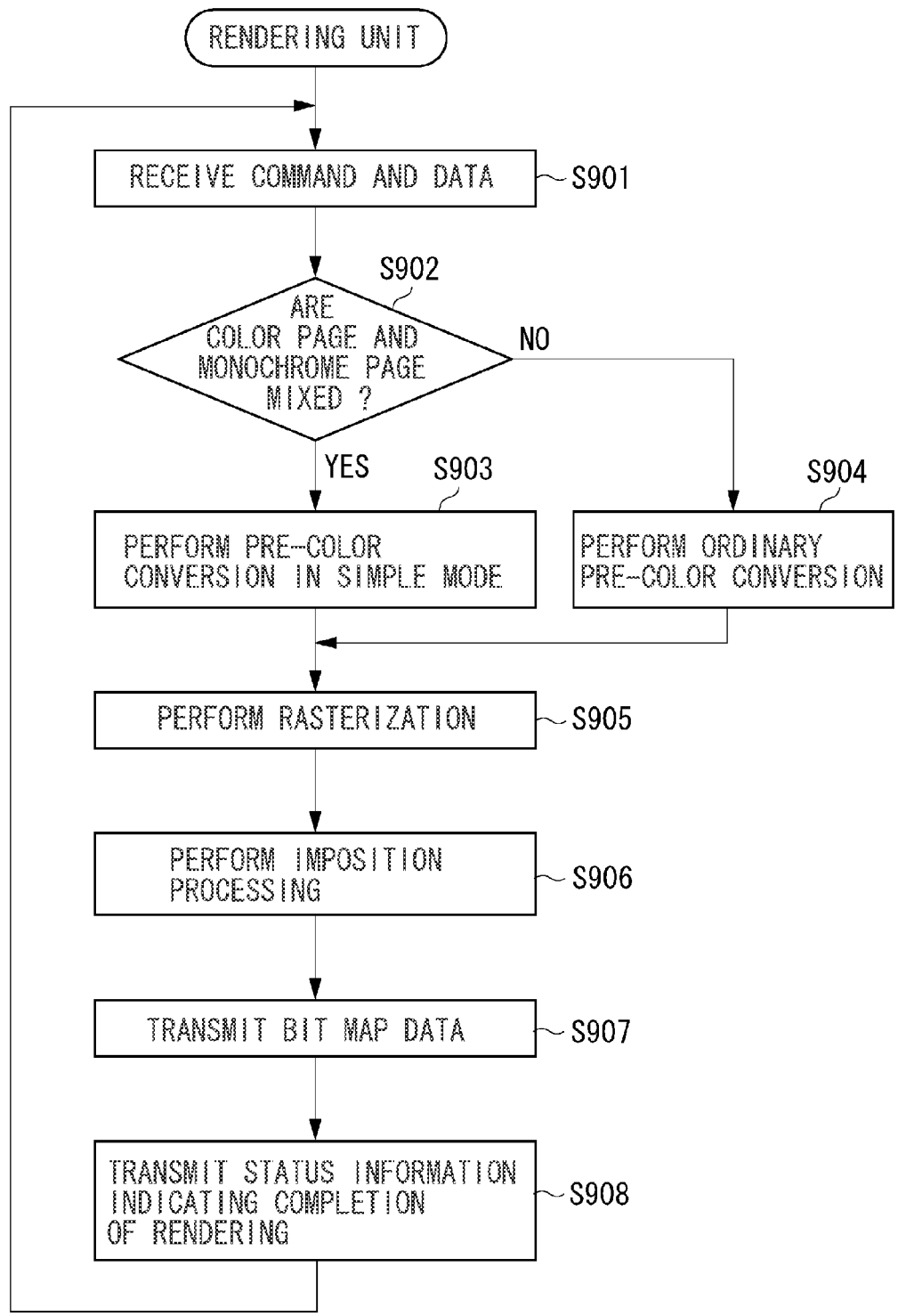
FIG. 9 is a flowchart illustrating processing by a rendering unit according to the exemplary embodiment of the present invention.

The flow of processing by the rendering unit 204 will be described with reference to FIG. 9.

In step S901, the rendering unit 204 receives, at the transmitting/receiving unit 211, a command and data from the control unit 203. In step S902, the rendering unit 204 analyzes the received command, and determines whether the job has color mode pages and monochrome mode pages mixed in bit map data which is printed on the same side of the same sheet. If the job has a single piece of bit map data in which color pages and monochrome pages are mixed, as described in step S604 in FIG. 6, when the data was sent to the rendering unit 204, the control unit 203 determined that the data was to be processed automatically in color mode. Therefore, in step S903, pre-monochrome processing is performed in the simple mode. As described above, the printer engine unit 205 can use only type of a color conversion table even when color pages and monochrome pages are mixed in the bit map data which is printed on the same side of the same sheet. For this reason, in this mode, only the color conversion table 1 (220) for color mode is used. Therefore, regardless of whether there has been a setting made for a warm-tone black, a cold-tone black, or a pure black in monochrome processing, pre-monochrome processing is performed using the fourth pre-monochrome table 4 (226) to reproduce monochrome in color mode in a simple manner. Let it be assumed that the color conversion unit 218 is previously designed so that, in fact, processing is performed using the color conversion table 1 (220) in color mode depending on conversion results by the pre-monochrome table 4.

In step S902, if the job is not a type that has color pages and monochrome pages mixed in bit map data which is printed on the same side of the same sheet, then in step S904, ordinary pre-color conversion is performed. If the job is for monochrome mode, pre-color conversion processing is performed using the pre-monochrome tables 1 to 3 (223 to 225) according to the monochrome mode for a warm-tone black, a cold-tone black, or a pure black. The color conversion unit 218 is supposed to be previously designed to reproduce gray colors mentioned above depending on results of conversion by the pre-monochrome tables. If the job is of color mode, processing is performed by applying color matching intents, such as perceptual, saturation, and colorimetric ones separately for image objects, text objects, and graphics object.

In step S905, the rendering unit 204, by using the rasterization unit 216 in the image processing unit 212, interprets PDL data, performs logic drawing, and generates bit map data. In step S906, the rendering unit 204, by using the imposition processing unit 217, performs imposition processing according to a binding method, such as side stitching or saddle stitch binding, and according to a type of printing, such as one-sided or two-sided as instructed by a command from the control unit 203, for example, by imposing two pages to a medium for one page in the case of saddle stitch binding.

In step S907, the rendering unit 204 transmits the generated bit map data to the control unit 203. Header information of the bit map data to be sent to the control unit 203 includes information indicating whether the data is of color mode or monochrome mode. Since data subjected to pre-color conversion in color mode is added with information indicating that the data is of color mode, data which has been pre-color-converted in the simple mode is added with information indicating that the data is of color mode. Data which has been pre-color-converted in monochrome mode is added with information indicating that the data is of monochrome mode. In step S908, status information indicating that the job has passed through rendering processing is transmitted.

Figure 10:
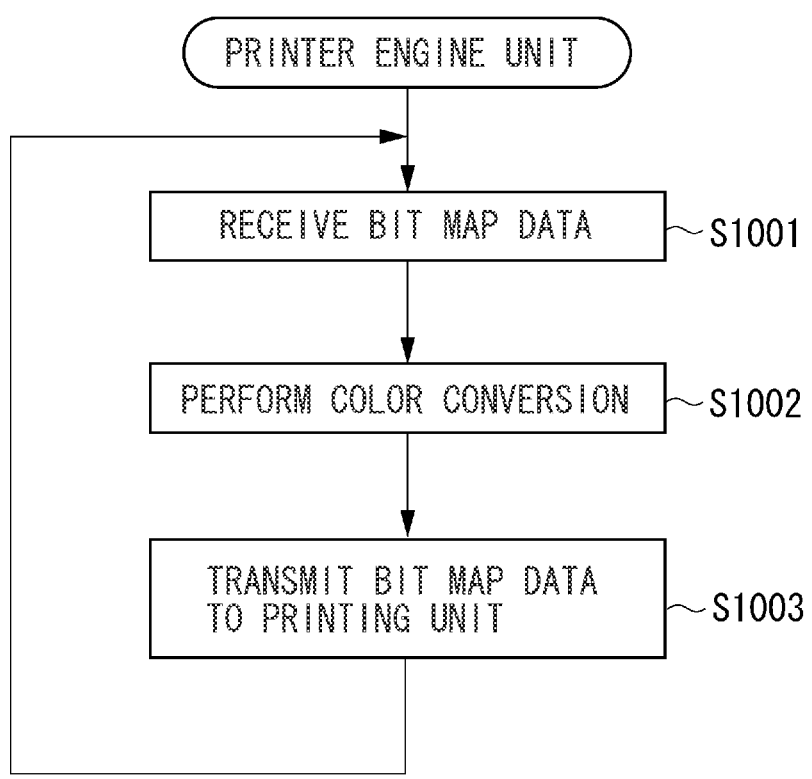
FIG. 10 is a flowchart illustrating processing by a printer engine according to the exemplary embodiment of the present invention.

The flow of processing by the printer engine unit 205 will be described with reference to FIG. 10.

In step S1001, the printer engine unit 205 receives bit map data from the control unit 203. In step S1002, the color conversion unit 218 performs color conversion on the received bit map data based on contents of header information of the data. The header information holds information, such as whether the data is of color mode or monochrome mode. The color conversion unit 218 uses the color conversion table 1 (220) when the data is of color mode or the color conversion table 2 (221) when the data is of monochrome mode. After the processing is completed, the color space is converted into CMYK as a color space handled by the printing unit 219 or performs binarization processing if necessary. In step S1003, the color-converted data is sent to the printing unit 219 and printed to a medium.

In the above description, when color pages and monochrome pages are mixed in bit map data which is printed on the same side of the same sheet, the pre-color conversion processing in the simple mode has been described as processing to be executed in this case. However, in a job in which color pages and monochrome pages are mixed, because of the layout of imposition, it is likely that color pages and monochrome pages are mixed in bit map data which is printed on the same side of the same sheet. Therefore, in a job in which color pages and monochrome pages are mixed, color conversion processing may be performed in the simple mode. By doing this, without the layout being analyzed, it is possible to quickly determine whether pre-color conversion processing should be performed in the simple mode.

As described above, in the present exemplary embodiment, even when a job includes color mode pages and monochrome mode pages, this is not treated as an error and processing is not stopped, so that by performing monochrome processing in the simple mode, color conversion processing can be executed at high speed. In this kind of job, by arranging for the job to be skipped automatically, print processing can be accelerated. As illustrated in FIG. 4, by allowing the user to previously select whether to perform the simple-type monochrome processing, usability can be improved. In processing to reproduce monochrome in the simple mode in a pseudo manner, since the user can select settings according to the user's level of satisfaction, printing can be implemented to give the user satisfaction.

As stated above, according to the present exemplary embodiment, even if monochrome data and color data are mixed in rendered bit map data, the user can select whether to perform monochrome processing prior to color conversion in color mode or whether to skip processing of the job.

The present invention can be implemented by performing processing as follows. Software (computer program/computer-executable instructions) to execute the functions of the exemplary embodiments described above is supplied to a system or an apparatus via a network or by using various types of storage media, and the computer (or CPU or MPU) of the system or the apparatus reads and executes the program/computer-executable instructions.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-102523 filed Apr. 27, 2010, which is hereby incorporated by reference herein in its entirety.

What is claimed is:

1. An image forming apparatus comprising:
    a rasterization unit configured to rasterize job data into bit map data;
    a color conversion unit configured to perform color conversion processing on the bit map data by using a color conversion table for color when the bit map data rasterized by the rasterization unit is subjected to color conversion in a color mode, and to perform color conversion processing on the bit map data by using a color conversion table for monochrome when the bit map data rasterized by the rasterization unit is subjected to color conversion in a monochrome mode;
    a pre-color conversion unit configured to perform color conversion processing on the job data by using a pre-color conversion table before the bit map data is subjected to the color conversion processing by the color conversion unit when the job data is rasterized into the bit map data by the rasterization unit; and
    a performing unit configured to, when color data and monochrome data are mixed in a piece of the job data to be rasterized by the rasterization unit, perform color conversion using the pre-color conversion table on the color and monochrome mixed job data by the pre-color conversion unit so that the color conversion unit performs color conversion processing on color and monochrome mixed bit map data by using the color conversion table for color.

2. The image forming apparatus according to claim 1, further comprising a setting unit configured to set by a user whether to perform color conversion using the pre-color conversion table by the pre-color conversion unit on the color and monochrome mixed job data or whether to disable printing the job data including the piece of the job data in which the color data and the monochrome data are mixed.

3. The image forming apparatus according to claim 2, wherein, when disabling printing the job data including the bit map data in which the color data and the monochrome data are mixed is set, the rasterization unit does not rasterize the job data including the bit map data in which the color data and the monochrome data are mixed.

4. The image forming apparatus according to claim 1, wherein the color conversion processing by the pre-color conversion unit, which is performed to enable the color conversion unit to perform color conversion processing on the color and monochrome mixed bit map data using the color conversion table for color, includes processing for enabling the color conversion unit to reproduce the monochrome data containing the color and monochrome mixed bit map data in a pseudo manner using the color conversion table for color.

5. A control method for an image forming apparatus, the method comprising:
    rasterizing job data into bit map data;
    performing color conversion processing on the bit map data by using a color conversion table for color when the bit map data is subjected to color conversion in a color mode, and performing color conversion processing on the bit map data by using a color conversion table for monochrome when the bit map data is subjected to color conversion in a monochrome mode;
    performing pre-color conversion processing on the job data by using a pre-color conversion table before the bit map data is subjected to the color conversion processing when the job data is rasterized into the bit map data; and performing, when color data and monochrome data are mixed in a piece of the job data to be rasterized, pre-color conversion using the pre-color conversion table on the color and monochrome mixed job data so that color conversion processing is performed on color and monochrome mixed bit map data by using the color conversion table for color.

6. The control method for an image forming apparatus according to claim 5, further comprising setting by a user whether to perform the pre-color conversion processing on the color and monochrome mixed job data to enable performing the color conversion processing using the color conversion table for color, or whether to disable printing the job data including the piece of the job data in which the color data and monochrome data are mixed.

7. A non-transitory computer-readable storage medium storing computer-executable instructions for causing a computer to function as an image forming apparatus comprising:
 a rasterization unit configured to rasterize job data into bit map data
 a color conversion unit configured to perform color conversion processing on the bit map data by using a color conversion table for color when the bit map data rasterized by the rasterization unit is subjected to color conversion in a color mode, and to perform color conversion processing on the bit map data by using a color conversion table for monochrome when the bit map data rasterized by the rasterization unit is subjected to color conversion in a monochrome mode;
 a pre-color conversion unit configured to perform color conversion processing on the job data by using a pre-color conversion table before the bit map data is subjected to the color conversion processing by the color conversion unit when the job data is rasterized into the bit map data by the rasterization unit; and
 a performing unit configured to, when color data and monochrome data are mixed in a piece of the job data to be rasterized by the rasterization unit, perform color conversion using the pre-color conversion table on the color and monochrome mixed job data by the pre-color conversion unit so that the color conversion unit performs color conversion processing on color and monochrome mixed bit map data by using the color conversion table for color.

8. An apparatus comprising:
 a rasterization unit configured to rasterize job data into bit map data;
 a color conversion unit configured to perform color conversion processing on the bit map data rasterized by the rasterization unit; and
 a pre-color conversion unit configured to perform color conversion processing on the job data before the bit map data is subjected to the color conversion processing by the color conversion unit,
 wherein the pre-color conversion unit performs, when color data and monochrome data are mixed in a piece of the job data, color conversion processing on the color and monochrome mixed job data so that the color conversion unit performs color conversion processing on color and monochrome mixed bit map data by using a color conversion table for color.

9. The apparatus according to claim 8, wherein the pre-color conversion unit performs color conversion processing on the job data by using a pre-color conversion table.

10. The apparatus according to claim 8, wherein the color and monochrome mixed bit map data is color mode pages and monochrome mode pages mixed in the bit map data which is printed on the same side of the same sheet.

11. The apparatus according to claim 8, wherein the apparatus is a printing apparatus.

12. A control method for an apparatus, the method comprising:
 rasterizing job data into bit map data;
 performing color conversion processing on the rasterized bit map data; and
 performing color conversion processing on the job data before the bit map data is subjected to the color conversion processing,
 wherein, when color data and monochrome data are mixed in a piece of the job data, color conversion processing on the color and monochrome mixed job data is performed so that color conversion processing on color and monochrome mixed bit map data is performed by using a color conversion table for color.

13. A non-transitory computer-readable storage medium storing computer-executable instructions for causing a computer to function as an apparatus comprising:
 a rasterization unit configured to rasterize job data into bit map data;
 a color conversion unit configured to perform color conversion processing on the bit map data rasterized by the rasterization unit; and
 a pre-color conversion unit configured to perform color conversion processing on the job data before the bit map data is subjected to the color conversion processing by the color conversion unit,
 wherein the pre-color conversion unit performs, when color data and monochrome data are mixed in a piece of the job data, color conversion processing on the color and monochrome mixed job data so that the color conversion unit performs color conversion processing on color and monochrome mixed bit map data by using a color conversion table for color.

* * * * *